(12) United States Patent
Cheng et al.

(10) Patent No.: US 8,850,175 B2
(45) Date of Patent: Sep. 30, 2014

(54) COMPUTER APPARATUS AND RESETTING METHOD FOR REAL TIME CLOCK THEREOF

(75) Inventors: Chun-Lin Cheng, New Taipei (TW); Yun-Chieh Sung, New Taipei (TW); Kai-Chieh Hsu, New Taipei (TW); Yu-Wei Tsao, New Taipei (TW)

(73) Assignee: Wistron Corporation, New Taipei (TW)

( * ) Notice: Subject to any disclaimer, the term of this patent is extended or adjusted under 35 U.S.C. 154(b) by 291 days.

(21) Appl. No.: 13/326,344

(22) Filed: Dec. 15, 2011

(65) Prior Publication Data

US 2013/0097452 A1   Apr. 18, 2013

(30) Foreign Application Priority Data

Oct. 18, 2011   (TW) .............................. 100137693 A

(51) Int. Cl.
*G06F 1/24* (2006.01)
*G06F 1/14* (2006.01)

(52) U.S. Cl.
CPC ... *G06F 1/14* (2013.01); *G06F 1/24* (2013.01)
USPC .................................................. 713/2; 713/1

(58) Field of Classification Search
USPC ......... 713/1, 2, 100, 300, 310, 320, 321, 322, 713/323, 324, 330, 340, 375
See application file for complete search history.

(56) References Cited

U.S. PATENT DOCUMENTS

| 6,253,319 | B1* | 6/2001 | Tran et al. .......................... 713/1 |
| 7,900,090 | B2 | 3/2011 | Agrawal et al. |
| 2003/0159076 | A1* | 8/2003 | Delisle et al. .................. 713/300 |
| 2007/0093975 | A1* | 4/2007 | Hoogenboom ................. 702/35 |
| 2009/0307511 | A1* | 12/2009 | Fiennes et al. ................. 713/323 |
| 2010/0090729 | A1* | 4/2010 | Shi .................................. 327/143 |

OTHER PUBLICATIONS

Julio Pineda, Power Sequence and Reset Utilizing the Intel EP80579 Integrated Product Line, Dec. 2008, pp. 6-7.*
"Office Action of Taiwan Counterpart Application", issued on Jan. 27, 2014, p. 1-p. 17.
"Office Action of Taiwan Counterpart Application", issued on May 5, 2014, p. 1-p. 7.

* cited by examiner

*Primary Examiner* — Paul Yanchus, III
*Assistant Examiner* — Paul J Yen
(74) *Attorney, Agent, or Firm* — Jianq Chyun IP Office

(57) ABSTRACT

A computer apparatus and a resetting method for a real time clock (RTC) of the computer apparatus are provided. The resetting method for the RTC includes: generating a judging result by determining whether the computer apparatus is in an S5 state and determining whether a plurality of pre-determined keys are simultaneously pressed; pulling down a resume reset signal according to the judging result and correspondingly pulling down an operating voltage; pulling down an S5 enabling signal after pulling down the operating voltage for a pre-determined delay time; generating an RTC reset signal for resetting the RTC after pulling down the S5 enabling signal is pulled down.

12 Claims, 3 Drawing Sheets

COMPUTER APPARATUS AND RESETTING METHOD FOR REAL TIME CLOCK THEREOF

CROSS-REFERENCE TO RELATED APPLICATION

This application claims the priority benefit of Taiwan application serial no. 100137693, filed on Oct. 18, 2011. The entirety of the above-mentioned patent application is hereby incorporated by reference herein and made a part of this specification.

BACKGROUND OF THE INVENTION

1. Field of the Invention

The invention relates to a computer apparatus, and in particular, to a resetting method for a real time clock (RTC) of a computer apparatus.

2. Description of Related Art

At present, in a process for fabricating a mother board of a computer apparatus, a system default value of a register inside a south bridge chip made by Intel Corporation is modified on certain conditions. For instance, the system default value of an RCBA+3F00 register inside a south bridge chip is 0X10B when the register is in use. Under abnormal circumstances, the system default value of the RCBA+3F00 register inside the south bridge chip is changed to 0X00B. The change of the system default value of the register poses an impact on the sleep function and the shutdown function of the computer apparatus having the register.

To resolve said issue, the Intel Corporation suggests resetting a real time clock (RTC) or discharging the CMOS battery after fabrication of the mother board, so as to reset the system to the default value. Conventionally, the RTC needs to be reset by manually disconnecting the ground voltage and the signal line of an RTC reset signal or by removing the CMOS battery for a period of time. Both solutions cause inconvenience to manufacture; what is more, the process for resetting the RTC cannot be precisely and certainly performed. Thereby, the computer apparatus cannot be manufactured in an efficient manner.

SUMMARY OF THE INVENTION

The invention provides a computer apparatus and a resetting method for a real time clock (RTC) of the computer apparatus, so as to easily and effectively reset the RTC of the computer apparatus.

In the invention, a resetting method for an RTC of a computer apparatus is provided. The resetting method for the RTC includes: generating a judging result by determining whether the computer apparatus is in an S5 state and determining whether a plurality of pre-determined keys are simultaneously pressed; pulling down a resume reset signal according to the judging result and correspondingly pulling down an operating voltage; pulling down an S5 enabling signal after pulling down the operating voltage for a pre-determined delay time; generating an RTC reset signal for resetting the RTC after pulling down the S5 enabling signal.

According to an embodiment of the invention, the step of generating the RTC reset signal for resetting the RTC after pulling down the S5 enabling signal includes generating the RTC reset signal at one end of a switch by applying an enabling voltage to the other end of the switch and providing a control signal to a control end of the switch to turn on the switch.

According to an embodiment of the invention, the enabling voltage and the control signal are provided by a keypad controller of the computer apparatus.

According to an embodiment of the invention, the switch is constructed by a transistor.

According to an embodiment of the invention, the transistor has a gate, a source, and a drain. The gate of the transistor is the control end of the switch, one of the source and the drain of the transistor receives the enabling voltage, and the other one of the source and the drain of the transistor generates the RTC reset signal.

According to an embodiment of the invention, the step of generating the judging result by determining whether the computer apparatus is in the S5 state and determining whether the pre-determined keys are simultaneously pressed includes: determining whether a power button of the computer apparatus is pressed.

According to an embodiment of the invention, the step of generating the judging result by determining whether the computer apparatus is in the S5 state and determining whether the pre-determined keys are simultaneously pressed further includes: determining whether the computer apparatus is merely supplied with an alternating current.

According to an embodiment of the invention, the resetting method further includes: when the judging result is negative and the computer apparatus is in an operation state, providing a writing interface to write an RTC reset command into an embedded controller of the computer apparatus and generating the RTC reset signal for resetting the real time clock by the embedded controller according to the RTC reset command.

According to an embodiment of the invention, the step of providing the writing interface to write the RTC reset command into the embedded controller of the computer apparatus includes: writing a writing command into a memory of the embedded controller by a south bridge chip via the writing interface; writing a writing address of the memory into the embedded controller by the south bridge chip via the writing interface; writing the RTC reset command into the embedded controller by the south bridge chip via the writing interface; writing the RTC reset command into the writing address of the memory and accordingly setting the RTC reset signal.

In the invention, a computer apparatus that includes an embedded controller and a switch is provided. The embedded controller serves to generate a judging result by determining whether the computer apparatus is in an S5 state and determining whether a plurality of pre-determined keys are simultaneously pressed. The embedded controller also pulls down a resume reset signal according to the judging result and correspondingly pulls down an operating voltage. Besides, the embedded controller pulls down an S5 enabling signal after pulling down the operating voltage for a pre-determined delay time. Moreover, the embedded controller correspondingly generates an enabling voltage and a control signal after pulling down the S5 enabling signal. The switch is coupled to the embedded controller. A first end of the switch receives the enabling voltage, a control end of the switch receives the control signal, and the switch generates the RTC reset signal at a second end of the switch according to the control signal.

Based on the above, the RTC can be easily reset by performing a pressing process on the combination of pre-determined keys, so as to effectively improve the efficiency and accuracy of inspecting and repairing the computer apparatus.

Several exemplary embodiments accompanied with figures are described in detail below to further describe the invention in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the invention and, together with the description, serve to explain the principles of the invention.

DETAILED DESCRIPTION OF DISCLOSED EXEMPLARY EMBODIMENTS

Figure 1:
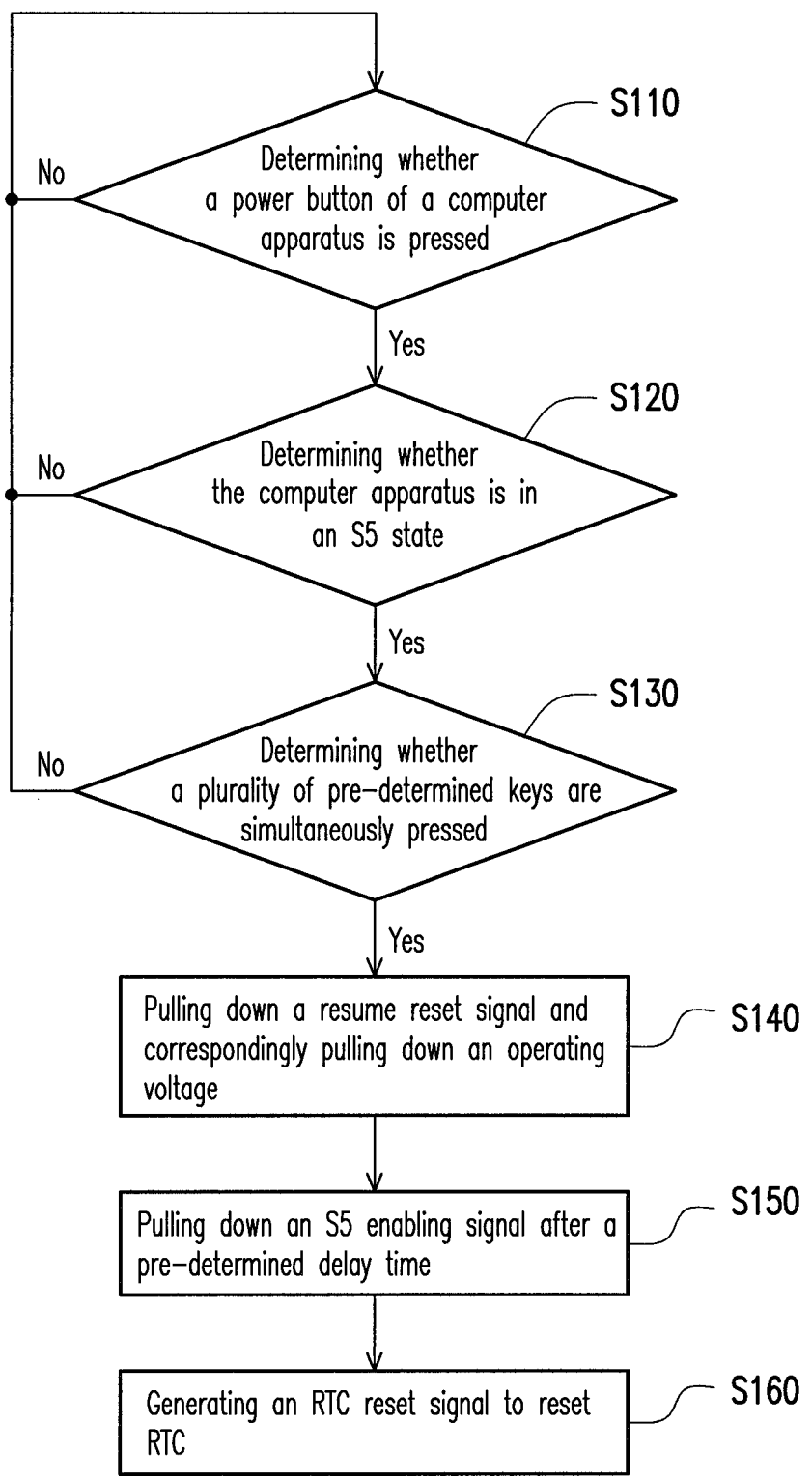
FIG. 1 is a flow chart illustrating a resetting method for an RTC of a computer apparatus according to an embodiment of the invention.

Please refer to FIG. 1. Specifically, FIG. 1 is a flow chart illustrating a resetting method for an RTC of a computer apparatus according to an embodiment of the invention. Steps in the resetting method include: determining whether a power button of the computer apparatus is pressed (S110), determining whether the computer apparatus is in an S5 state (S120), and determining whether a plurality of pre-determined keys of the computer apparatus are simultaneously pressed (S130). A judging result is generated according to the steps S110~S130. In particular, if the power button of the computer apparatus is pressed, the computer apparatus effectively enters an S5 state, and the pre-determined keys are simultaneously pressed, the judging result of resetting the RTC of the computer apparatus is correspondingly generated.

Note that the S5 state is defined in compliance with an Advanced Configuration and Power Interface (ACPI) standard. In accordance with the ACPI standard, an S0 operation state and five sleep states (S1~S5) are defined.

By contrast, if the computer apparatus does not effectively enter the S5 state, or the pre-determined keys are not simultaneously pressed, or both conditions occur, the judging result of not resetting the RTC of the computer apparatus is correspondingly generated.

It should be mentioned the pre-determined keys may be four, for instance, and the four pre-determined keys may be any three keys on the keypad and the power switch of the computer apparatus. Certainly, the configuration of the four pre-determined keys is merely exemplary, and a designer is able to set the number of pre-determined keys and combine the pre-determined keys at his or her discretion.

Besides, if it is to be determined whether the RTC is reset on the condition that the computer apparatus does not receive any direct current, the determination may be made by detecting whether the computer apparatus is merely supplied with an alternating current. If the computer apparatus merely receives the direct current supplied by a battery, for instance, no judging result of resetting the RTC of the computer apparatus is generated.

After the judging result of resetting the RTC of the computer apparatus is obtained, a resume reset signal RSMRST# is pulled down according to this embodiment, and an operating voltage of the computer apparatus is also pulled down (S140) correspondingly. Note that the operating voltage of the computer apparatus is, for instance, a direct voltage (=3.3 volts (V)) applied in the computer apparatus.

After the operating voltage is pulled down for a pre-determined delay time, an S5 enabling signal is pulled down (S150). Note that the RTC reset function can be executed only after the computer apparatus is in the S5 state and is powered off, as stipulated in a power supplying timing specification by the Intel Corporation. Therefore, the S5 enabling signal is pulled down first in this embodiment to comply with the specification. Moreover, the RTC need be reset after completely releasing the charges accumulated when the computer apparatus is in the S0 operation state. Hence, there must be a time difference (i.e., a pre-determined delay time) between the time at which the operating voltage is pulled down and the time at which the S5 enabling signal is pulled down, and the pre-determined delay time cannot be shorter than 500 ms.

While the S5 enabling signal is continuously pulled down, an RTC reset signal is generated to reset the RTC (S160). For instance, in this embodiment, while the S5 enabling signal is continuously pulled down, the RTC reset signal for resetting the RTC may be generated by a switch (not shown) that is connected to a signal line through which the RTC reset signal is transmitted.

To be more specific, an enabling voltage is applied to one end of the switch which is not connected to the signal line through which the RTC reset signal is transmitted, and a control signal is provided to a control end of the switch to turn on the switch. Thereby, the enabling voltage is transmitted to the other end of the switch which is connected to the signal line through which the RTC reset signal is transmitted, so as to generate the RTC reset signal that is equal to the enabling voltage (e.g., zero voltage level). In other words, the RTC can be effectively reset by the RTC reset signal which is equal to zero voltage level.

It should be mentioned that each step described above can be performed by an embedded controller of the computer apparatus.

Figure 2A:
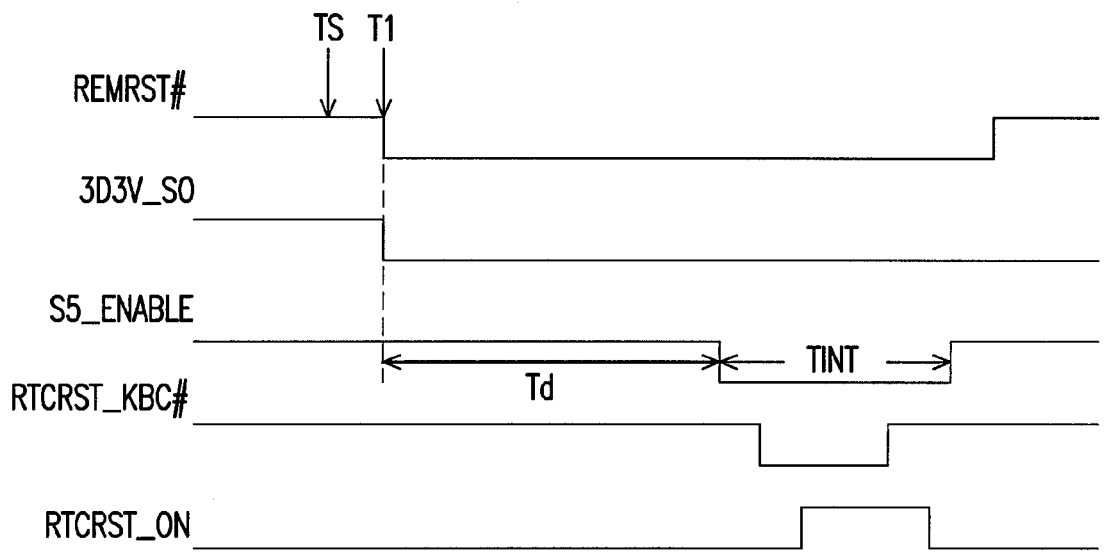
FIG. 2A is a waveform diagram illustrating operations of an embedded controller according to an embodiment of the invention.
Figure 2B:
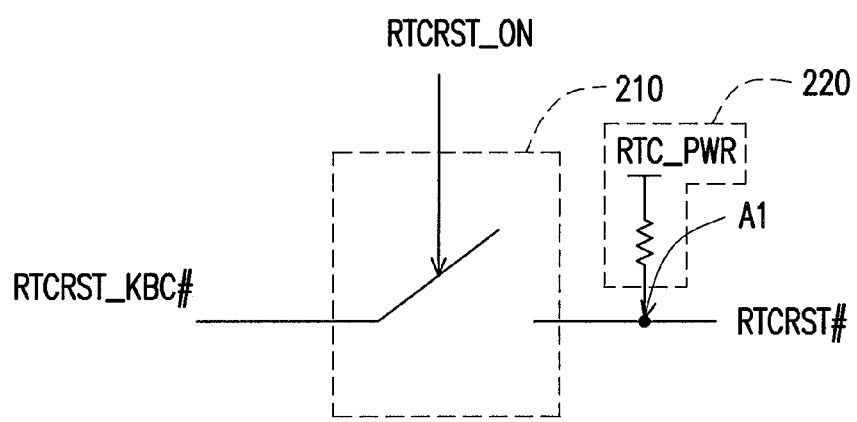
FIG. 2B is a schematic view illustrating a switch according to an embodiment of the invention.

Please refer to FIG. 2A and FIG. 2B. FIG. 2A is a waveform diagram illustrating operations of an embedded controller according to an embodiment of the invention, and FIG. 2B is a schematic view illustrating a switch according to an embodiment of the invention. As shown in FIG. 2A, at the time TS, the embedded controller in the computer apparatus determines to reset the RTC according to the judging result obtained by performing the steps S110~S130, and the embedded controller pulls down the resume reset signal RSMRST# at the time T1. When the resume reset signal RSMRST# is pulled down, an operating voltage 3D3V_S0 of the computer apparatus is correspondingly pulled down at the same time. After pulling down the resume reset signal RSMRST# for a pre-determined delay time Td, the embedded controller pulls down an S5 enabling signal S5_ENABLE. In FIG. 2A, the S5 enabling signal S5_ENABLE is continuously pulled down at a time interval TINT. It should be mentioned that the time interval TINT of this embodiment is set as one second. Besides, at the time interval TINT, the embedded controller provides a low-level enabling voltage RTCRST_KBC# and a high-level control signal RTCRST_ON to the switch.

With reference to FIG. 2A and FIG. 2B, the switch 210 is turned on based on the high-level control signal RTCRST_ON received by the switch 210, and the switch 210 transmits the low-level enabling voltage RTCRST_KBC# to an end A1 of the switch 210, so as to generate an RTC reset signal RTCRST# that is equal to the enabling voltage RTCRST_KBC# and reset the RTC according to the low-level RTC reset signal RTCRST#.

When the switch 210 is turned off, the RTC reset signal RTCRST# is pulled up to a voltage level equal to that of the power supply RTC_PWR because the end A1 is coupled to a pull-up circuit 220. As such, the RTC reset signal RTCRST# has a high voltage level.

Figure 3:
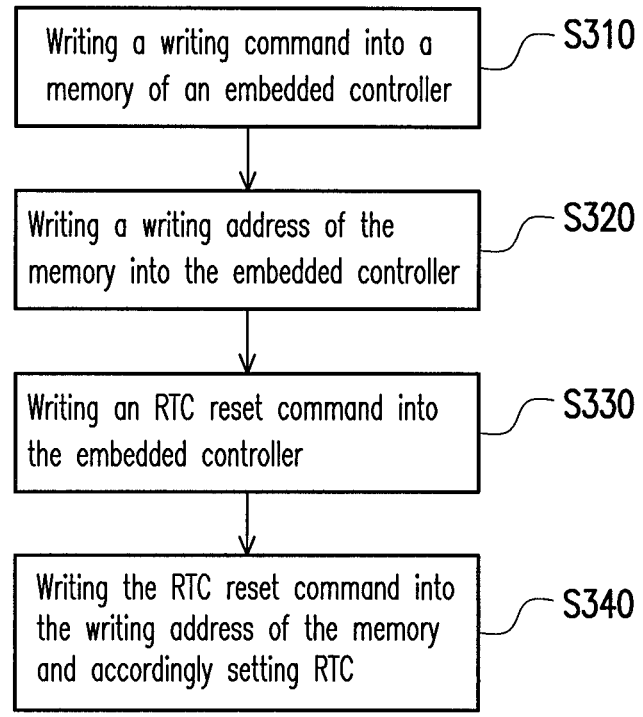
FIG. 3 is a flow chart illustrating a resetting method for an RTC according to another embodiment of the invention.

Please refer to FIG. 3. Specifically, FIG. 3 is a flow chart illustrating a resetting method for an RTC according to another embodiment of the invention. When the computer apparatus is not in an S5 state but in an S0 operation state, an RTC reset command may be written into an embedded controller of the computer apparatus by providing a writing interface. The embedded controller accordingly generates the RTC reset signal according to the RTC reset command, so as to reset the RTC.

In particular, a writing command is written into a memory of the embedded controller by a south bridge chip via the writing interface (S310); a writing address of the memory is written into the embedded controller by the south bridge chip via the writing interface (S320); the RTC reset command is written into the embedded controller by the south bridge chip via the writing interface (S330); the RTC reset command is written into the writing address of the memory, so as to set the RTC reset signal (S340).

Note that the voltage of the RTC reset signal can be set by performing steps S140~S160 shown in FIG. 1 after the RTC reset command is written into the writing address of the memory. The details of performing steps S140~S160 are clearly described in the afore-mentioned embodiments, and thus no further description is provided herein.

Figure 4:
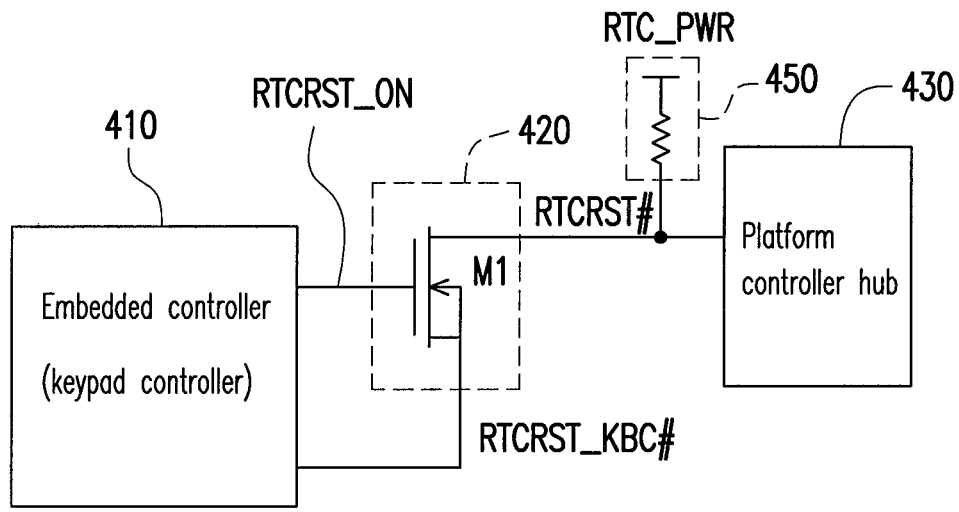
FIG. 4 is a schematic view illustrating a computer apparatus 400 according to an embodiment of the invention.

Please refer to FIG. 4. Specifically, FIG. 4 is a schematic view illustrating a computer apparatus 400 according to an embodiment of the invention. The computer apparatus 400 includes an embedded controller 410, a switch 420, a platform controller hub 430, and a pull-up circuit 450. The embedded controller 410 serves to generate a judging result by determining whether the computer apparatus 400 is in an S5 state and determining whether a plurality of pre-determined keys are simultaneously pressed. The embedded controller 410 also pulls down a resume reset signal according to the judging result and correspondingly pulls down an operating voltage. Besides, the embedded controller 410 pulls down an S5 enabling signal after pulling down the operating voltage for a pre-determined delay time. Moreover, the embedded controller 410 correspondingly generates an enabling voltage RTCRST_KBC# and a control signal RTCRST_ON after pulling down the S5 enabling signal. The pull-up circuit 450 is coupled to a coupling end between the platform controller hub 430 and the switch 420, so as to pull up the RTC reset signal RTCRST# to a voltage level equal to the power supply RTC_PWR when the switch 420 is turned off.

The switch 420 is constructed by the transistor M1. The gate of the transistor M1 receives the control signal RTCRST_ON, the source of the transistor M1 receives the enabling voltage RTCRST_KBC#, and the drain of the transistor M1 generates the RTC reset signal RTCRST#. In addition, the RTC reset signal RTCRST# is transmitted to the platform controller hub 430.

Note that the embedded controller 410 may be a keypad controller. The control signal RTCRST_ON and the enabling voltage RTCRST_KBC# may be generated via a general purpose input-output (GPIO) interface on the keypad controller.

In light of the foregoing, when the resetting method for the RTC is applied, the RTC can be effectively reset by performing a pressing process on the simple combination of pre-determined keys, and whether the switch is turned on or off should also be taken into consideration. As a result, the computer apparatus can be fabricated efficiently, and product accuracy can be ensured.

It will be apparent to those skilled in the art that various modifications and variations can be made to the structure of the invention without departing from the scope or spirit of the disclosure. In view of the foregoing, it is intended that the disclosure cover modifications and variations of this invention provided they fall within the scope of the following claims and their equivalents.

What is claimed is:

1. A resetting method for a real time clock of a computer apparatus, the resetting method comprising:
   generating a judging result by determining whether the computer apparatus is in an S5 state and determining whether a plurality of pre-determined keys are simultaneously pressed;
   pulling down a resume reset signal according to the judging result and correspondingly pulling down an operating voltage;
   pulling down an S5 enabling signal after pulling down the operating voltage for a pre-determined delay time; and
   generating a real time clock reset signal for resetting the real time clock after pulling down the S5 enabling signal,
   when the judging result is negative and the computer apparatus is in an operation state, writing a real time clock reset command into an embedded controller of the computer apparatus by providing a writing interface, and generating the real time clock reset signal for resetting the real time clock by the embedded controller according to the real time clock reset command.

2. The resetting method as recited in claim 1, wherein the step of generating the real time clock reset signal for resetting the real time clock after pulling down the S5 enabling signal comprises:
   generating the real time clock reset signal at one end of a switch by applying an enabling voltage to the other end of the switch and providing a control signal to a control end of the switch to turn on the switch.

3. The resetting method as recited in claim 2, wherein the enabling voltage and the control signal are provided by a keypad controller of the computer apparatus.

4. The resetting method as recited in claim 2, wherein the switch is constructed by a transistor.

5. The resetting method as recited in claim 4, wherein the transistor has a gate, a source, and a drain, the gate of the transistor is the control end of the switch, one of the source and the drain of the transistor receives the enabling voltage, and the other one of the source and the drain of the transistor generates the real time clock reset signal.

6. The resetting method as recited in claim 1, wherein the step of generating the judging result by determining whether the computer apparatus is in the S5 state and determining whether the pre-determined keys are simultaneously pressed comprises:
   determining whether a power button of the computer apparatus is pressed.

7. The resetting method as recited in claim 6, wherein the step of generating the judging result by determining whether the computer apparatus is in the S5 state and determining whether the pre-determined keys are simultaneously pressed further comprises:
   determining whether the computer apparatus is merely supplied with an alternating current.

8. The resetting method as recited in claim 1, wherein the step of generating the judging result by determining whether the computer apparatus is in the S5 state and determining whether the pre-determined keys are simultaneously pressed further comprises:
   determining whether the computer apparatus is merely supplied with an alternating current.

9. The resetting method as recited in claim 1, wherein the step of writing the real time clock reset command into the embedded controller of the computer apparatus by providing the writing interface comprises:
- writing a writing command into a memory of the embedded controller by a south bridge chip via the writing interface;
- writing a writing address of the memory into the embedded controller by the south bridge chip via the writing interface;
- writing the real time clock reset command into the embedded controller by the south bridge chip via the writing interface; and
- writing the real time clock reset command into the writing address of the memory and accordingly setting the real time clock reset signal.

10. A computer apparatus comprising:
- an embedded controller for generating a judging result by determining whether the computer apparatus is in an S5 state and determining whether a plurality of pre-determined keys are simultaneously pressed, the embedded controller pulling down a resume reset signal according to the judging result and correspondingly pulling down an operating voltage, the embedded controller pulling down an S5 enabling signal after pulling down the operating voltage for a pre-determined delay time, the embedded controller generating an enabling voltage and a control signal after pulling down the S5 enabling signal, wherein when the judging result is negative and the computer apparatus is in an operation state, the embedded controller of the computer apparatus receives a real time clock reset command by a writing interface, and the embedded controller generates the real time clock reset signal for resetting the real time clock according to the real time clock reset command; and
- a switch coupled to the embedded controller, a first end of the switch receiving the enabling voltage, a control end of the switch receiving the control signal, the switch generating the real time clock reset signal at a second end of the switch according to the control signal.

11. The computer apparatus as recited in claim 10, wherein the embedded controller is a keypad controller.

12. The computer apparatus as recited in claim 10, wherein the switch is a transistor, the transistor has a gate, a source, and a drain, the gate of the transistor receives the control signal, the source of the transistor receives the enabling voltage, and the drain of the transistor generates the real time clock reset signal equal to the enabling voltage when the transistor is turned on according to the control signal.

* * * * *